June 27, 1967     A. P. SAHA     3,327,762
FURNACE
Filed July 26, 1965
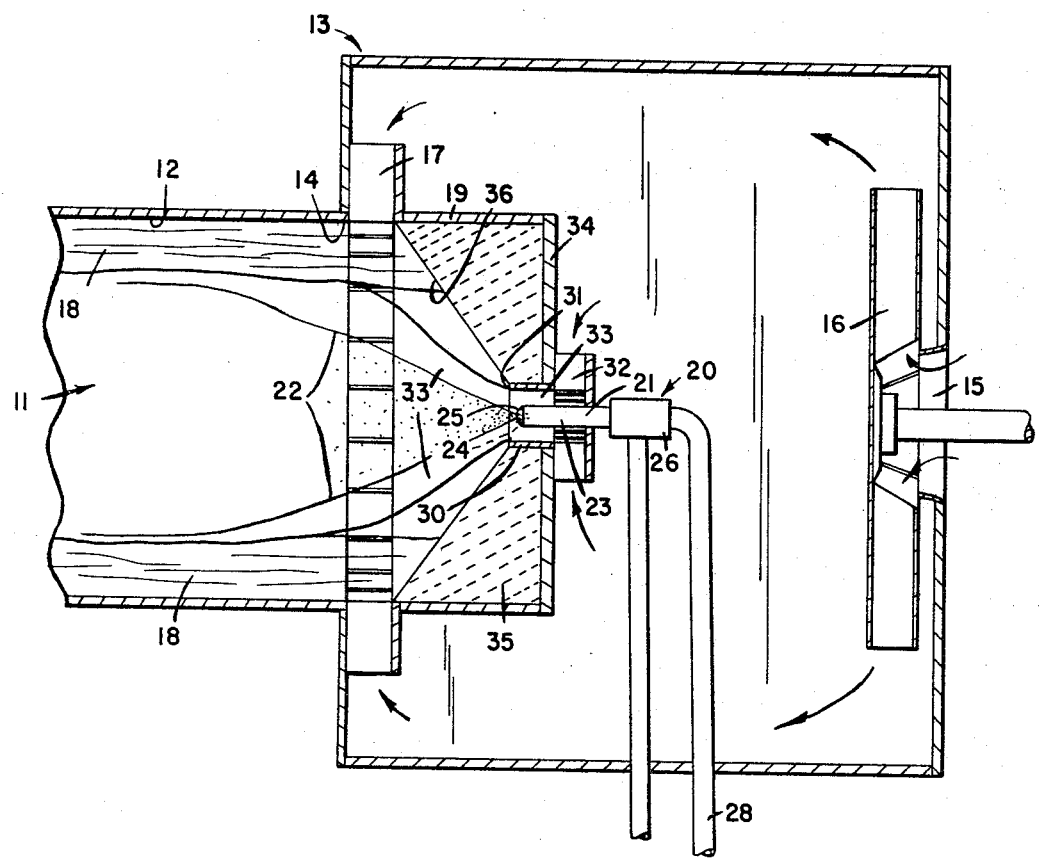
INVENTOR.
AATTO P. SAHA.
BY
ATTORNEY.

United States Patent Office 3,327,762
Patented June 27, 1967

3,327,762
FURNACE
Aatto P. Saha, Jamesville, N.Y., assignor to Carrier Corporation, Syracuse, N.Y., a corporation of Delaware
Filed July 26, 1965, Ser. No. 474,792
2 Claims. (Cl. 158—1.5)

This invention relates to a cyclonic combustion furnace and, more particularly, to a furnace providing improved flame characteristics.

A common problem in furnaces burning a spray of fuel such as fuel oil for example, is that of flame stabilization, that is, providing a flame holding and flame shaping or spreading zone about the spray. To remedy this problem, a small amount of jet air, commonly known as primary air, is injected axially along the nozzle and fuel spray to stablize the flame and cool the nozzle. However, a generally undesirable result of this practice is lengthening of the flame which results in reduced output of the furnace or requires a larger furnace combustion chamber for satisfactory output and efficiency. To overcome these shortcomings, the present furnace replaces the jet of air with a vortex of air generally coaxial with and whirling about the nozzle and encasing the spray. The vortex moves slowly axially and whirls rapidly about its axis so that a substantially larger quantity of air and fuel may be injected into the furnace while holding the flame on the nozzle and providing a substantially shorter flame with greater input capacity and furnace efficiency.

In most prior cyclonic combustion furnaces a vortex of substantially all combustion air provided in the furnace is generated at an end of the furnace and combines and burns with a spray of fuel while traveling slowly axially through the furnace and spinning tangentially on the furnace wall to provide more intense heat and better heat transfer to the furnace wall. The present furnace further provides better flame characteristics by permitting the small vortex at the nozzle to diverge toward the main combustion air vortex and thus aid divergence of the flame and spray of fuel into the main vortex.

It is a primary object of this invention to provide a new and improved cyclonic combustion furnace and, more particularly, such a furnace in which a vortex provides substantially all of the combustion air in the furnace except for a relatively smaller portion of air provided as a smaller vortex which holds the flame on the nozzle and aids the flame in diverging outwardly into the main vortex to provide a shorter flame with greater input capacity and efficiency of the furnace.

Other objects and advantages of the invention will be apparent from the following description and drawing which is a fragmentary, schematic axial sectional view of the fuel input end of a cyclonic combustion furnace.

As illustrated in the drawing, a cyclonic combustion furnace includes a combustion chamber 11 having a vortex confining wall which may be a generally cylindrical wall 12. Combustion air is supplied through a plenum chamber 13 which extends from an end 14 of the furnace wall 12 and has an air inlet 15 associated with a suitable blower 16 for passing combustion air (note arrows) through a first or main vortex forming vane ring 17 secured on the end 14 of the furnace wall 12 within the air plenum 13. Most of the combustion air for the furnace enters through the main vane ring 17 and is formed into an annular free spiral vortex 18 traveling slowly axially of the combustion chamber 11 and whirling rapidly tangentially along the wall 12.

A fuel burner support 19 extends from the main vane ring 17 within the plenum 13 and suitably mounts a fuel burner 20. The burner 20 is part of fuel supply means and includes a fuel nozzle 21 for projecting a diverging spray of fuel 22, preferably fuel oil, into the combustion chamber 11 in a direction generally coaxial with the furnace wall 12. The illustrated fuel nozzle 21 comprises an elongated fuel carrying conduit 23 having a fuel spraying orifice 24 at one end 25 opening into the combustion chamber 11 and an opposite end 26 connected with a fuel oil inlet line 28.

The elongated nozzle conduit 23 is axially enveloped by a tube 30 which has an end 31 opening into the combustion chamber 11 just slightly ahead of the nozzle orifice 24. A second vortex forming vane ring 32 is within the air plenum 13 concentric with the second end 26 of the tube 30 and generates a second annular free spiral vortex 33 which travels slowly axially through the tube 30 as its eye receives the nozzle conduit 23 and its annular portion whirls rapidly about the nozzle conduit to cool the nozzle 21. As the vortex 33 passes the orifice end 25 of the nozzle and is projected from the open end 31 of the tube 30 it diverges toward the main vortex 18 and the divergence of its eye conforms generally to the divergence of the spray 22 as regulated by the axial and whirling velocities of the vortex 33 and by the nozzle 21, respectively. The vortex 33 combines with the spray of fuel 22 and upon suitable ignition the mixture burns and the resultant flame is held on the nozzle end 25 by the vortex 33. Divergence of the vortex 33 outwardly toward the main vortex 18 at the first vane ring 17 aids the flame and spray of fuel oil in diverging and moving into the main vortex for complete combustion of the fuel in combination with the main vortex combustion air.

The support 19 which mounts the burner 20 has a socket 34 holding refractory material 35 providing an annular, and as illustrated, a frusto-conical surface 36 diverging outwardly from the open end 31 of the tube 30 and toward the furnace wall 12 and, more particularly, to the main vane ring 17. The frusto-conical surface 36 is preferably shaped so that the vortex of flame, fuel spray and combustion air are substantially unobstructed in their diverging flow toward the main vortex 18.

While a prefered embodiment of the invention has been described and illustrated, it should be understood that the invention is not limited thereto but may be otherwise embodied within the scope of the following claims.

I claim:

1. A cyclonic combustion furnace comprising a combustion chamber having a generally cylindrical vortex confining furnace wall with an end, fuel supply means including a nozzle having an orifice opening into said chamber at said end for projecting a spray of liquid fuel into said chamber, combustion air supply means including a plenum chamber adapted to generate at said end of said wall annular vortices of combustion air in said chamber to combine and burn with the fuel spray and provide a flame for heating the furnace and including a vane ring in said plenum chamber, air entering said vane ring in a direction substantially perpendicular to the axis of the combustion chamber, said vane ring being adapted to form a first of said vortices moving generally coaxially with said wall and whirling generally tangentially on the wall, most of the combustion air being supplied through said vane ring, and second means to supply the remainder of the combustion air adapted to form a second of said vortices moving generally coaxial of the fuel spray nozzle and encircling and whirling closely about the nozzle orifice and fuel spray to hold said flame on said nozzle, and diverging from said nozzle orifice into said first vortex to promote divergence of said flame and spray from said nozzle into said main vortex at said end of said wall, and closure means effectively closing said chamber at said end and permitting said divergence of the second vortex from the nozzle to the main vortex, said second means including means adapted to project said second vortex along said nozzle in heat exchange relation with said nozzle to cool the nozzle.

2. The furnace of claim 1 wherein said nozzle includes an elongated fuel carrying conduit extending from said nozzle orifice, and the last said means includes a tube encasing and spaced from said conduit and having opposite ends including an open end adjacent said nozzle orifice adapted to project said second vortex into said combustion chamber, and means communicating with the end of said tube opposite said open end adapted to generate said second vortex and pass said second vortex through said tube coaxially with said nozzle in heat exchange relation with said nozzle to cool the same.

References Cited

UNITED STATES PATENTS

| | | | |
|---|---|---|---|
| 2,097,255 | 10/1937 | Saha | 158—1.5 X |
| 2,287,057 | 6/1942 | Page | 122—149 |
| 2,473,347 | 6/1949 | Sanborn | 158—4 X |
| 2,738,776 | 3/1956 | Burg | 110—28 |
| 2,986,206 | 5/1961 | Boelsma | 158—4 |
| 3,195,609 | 7/1965 | Nesbitt et al. | 158—1.5 X |

FREDERICK L. MATTESON, JR., *Primary Examiner.*

E. G. FAVORS, *Assistant Examiner.*